US006154604A

United States Patent [19]

Iwasaki

[11] Patent Number: 6,154,604

[45] Date of Patent: Nov. 28, 2000

[54] SIGNAL PROCESSOR FOR CONVERTING PLAYBACK SIGNAL IN NTSC STANDARDS TO VIDEO SIGNAL USED IN PAL SYSTEM AND METHOD OF SIGNAL PROCESSING USED THEREIN

[75] Inventor: Kiyoshi Iwasaki, Tokyo, Japan

[73] Assignee: NEC Corporation, Tokyo, Japan

[21] Appl. No.: 09/090,147

[22] Filed: Jun. 4, 1998

[30] Foreign Application Priority Data

Jun. 4, 1997 [JP] Japan .................................... 9-146250

[51] Int. Cl.$^{7}$ ................................ H04N 5/76; H04N 7/01

[52] U.S. Cl. ............................................ 386/131; 348/454

[58] Field of Search ............................ 386/46, 111, 112, 386/131, 34, 40, 41; 348/454; H04N 5/76, 7/01

[56] References Cited

U.S. PATENT DOCUMENTS 4,500,930 2/1985 Hamalainen et al. .................. 386/131
4,573,086 2/1986 Sakai et al. ............................ 386/131

FOREIGN PATENT DOCUMENTS 7-298160 11/1995 Japan .

*Primary Examiner*—Huy Nguyen
*Attorney, Agent, or Firm*—Sughrue, Mion, Zinn, Macpeak & Seas, PLLC

[57] ABSTRACT

A video signal processor includes a decoder supplied with a playback signal formatted in accordance with the standards of National Television System Committee and producing a digital video signal with a vertical synchronous frequency and a horizontal synchronous frequency satisfying a standard of Phase Alternation by Line Color Television System, an encoder connected to said decoder and producing said analog video signal with a color sub-carrier frequency satisfying another standard of said Phase Alternation by Line Color Television System and a signal generator supplying a clock signal and a color carrier signal regulating the horizontal synchronous frequency and the color sub-carrier frequency to the relation expressed as $$fsc=\{(1135/4)+(1/521)\}f_H$$

where fsc is said color sub-carrier frequency and $f_H$ is said horizontal synchronous frequency, and a moving picture reproduced from the analog video signal is free from color difference due to a dot crawling interference.

14 Claims, 4 Drawing Sheets

SIGNAL PROCESSOR FOR CONVERTING PLAYBACK SIGNAL IN NTSC STANDARDS TO VIDEO SIGNAL USED IN PAL SYSTEM AND METHOD OF SIGNAL PROCESSING USED THEREIN

FIELD OF THE INVENTION

This invention relates to a signal processing technology and, more particularly, to a signal processor for converting a playback signal in the NTSC (National Television System Committee) standards to a video signal used in a PAL (Phase Alternation by Line color television) system and a method of signal processing used therein.

DESCRIPTION OF THE RELATED ART

An information storage medium for pieces of video information is called as "video compact disk". Pieces of video information representative of a moving picture is stored in the video compact disk through a digitization and a data compression in accordance with the MPEG (Moving Picture coding Experts Group) standards. On the other hand, a video signal for a color television system is processed in accordance with the NTSC standards or the PAL standards. Thus, there are different standard groups for the video signal, and the pieces of video information are processed so as to be reproduced on a screen of a color television system in the NTSC standards or the PAL system.

FIG. 1 illustrates a typical example of the video reproducing apparatus. Pieces of video information are stored on a recording surface 1*a* of a video compact disk 1, and a head 2 is opposed to the recording surface 1*a*. The head 2 radiates a laser light beam 2*a* toward the recording surface 1*a*, and receives the reflection 2*b*. The reflection 2*b* carries the pieces of video information, and the pieces of video information are successively conveyed to the head 2. The head 2 converts the reflection 2*b* to a playback signal S1, and supplies the playback signal S1 through a signal processing circuit 3*a* to an MPEG decoder 3*b*. A video encoder 3*c* is connected to the output port of the MPEG decoder 3*b*, and a synchronous signal generator 3*d* supplies a synchronous signal S2 to the MPEG decoder 3*b* and the video encoder 3*c*.

An essential part of the playback signal S1 is processed by the signal processing circuit 3*a*, and is supplied to the MPEG decoder 3*b*. The MPEG decoder 3*b* is operative on the synchronous signal S2, and decodes the essential part into a digital video signal. A data expansion is a part of the decoding operation. The digital video signal S3 is supplied to the video encoder 3*c*, and the video encoder 3*c* converts the digital video signal S3 to an analog video signal. The video encoder 3*c* introduces a synchronous signal component of the synchronous signal S2 into the analog video signal, and produces a standard composite analog color video signal S4. The standard composite analog color video signal S4 is supplied to a color television receiver 4, and the color television receiver 4 reproduces the moving picture on a screen 4*a*.

The pieces of video information may be standardized in the NTSC standards in the video compact disk 1, and the color television receiver 4 may be designed to reproduce the moving picture from the composite analog color video signal S4 in the PAL system. In this situation, the video reproducing apparatus is expected to produce the composite analog color signal S4 in the PAL standards from the playback signal S1 in the NTSC standards. A playback signal in conformity with the NTSC standards is referred to as "NTSC signal", and a composite color video signal used in the PAL system is hereinbelow referred to as "PAL signal".

Japanese Patent Publication of Unexamined Application No. 7-298160 discloses the video reproducing apparatus of the type producing a PAL signal from an NTSC signal. The prior art video reproducing apparatus adjusts the field frequency and the number of lines of the composite color video signal to 60 Hz and 480 in conformity with the NTSC standards, and the other properties such as a carrier frequency of chrominance signal and the modulation system are determined on the basis of the PAL standards.

FIG. 2 illustrates an example of the video reproducing apparatus of the type producing a PAL signal from an NTSC signal. The prior art video reproducing apparatus also includes a head 5, a signal processing circuit 6*a*, an MPEG decoder 6*b* and a video encoder 6*c*, and the synchronous signal generator 3*d* is replaced with a clock generating circuit 6*d*. The clock generating circuit 6*d* supplies a clock signal Vclk to the MPEG decoder 6*b* and a color carrier signal at a sub-carrier frequency fsc to the video encoder 6*c*. The color carrier signal is used in the color modulation.

The prior art video reproducing apparatus behaves as follows. Pieces of video information are stored in a video compact disk 7, and represent a moving picture in conformity with the NTSC standards. The head 5 produces a playback signal S6 representative of the pieces of video information from the reflection, and supplies the playback signal S6 through the signal processing circuit 6*a* to the MPEG decoder 6*b*. The MPEG decoder 6*b* produces a horizontal synchronous signal and a vertical synchronous signal on the basis of the clock signal Vclk. The MPEG decoder 6*b* decodes the essential part into a digital video signal under the conditions of 858 pixels per each horizontal line and 525 lines per each frame, and a data expansion is carried out during the decoding. The digital video signal is supplied to the video encoder 6*c*, and the video encoder 6*c* converts the digital video signal to an analog video signal. The video encoder 6*c* carries out a color modulation using a color carrier signal fsc at the color sub-carrier frequency, and produces a composite color video signal. The composite color video signal is the PAL signal, and is supplied to a television receiver (not shown) in the PAL system.

FIG. 3 illustrates the clock generating circuit 6*d*. The clock generating circuit 6*d* includes a phase lock loop 7*a*, an oscillator 7*b* and frequency dividers 7*c*/7*d*. A voltage controlled oscillator 7*e*, a frequency divider 7*f*, a phase comparator 7*g* and a low-pass filter 7*h* form the phase locked loop 7*a*. The oscillator 7*b* oscillates at 17.7 MHz, which is four times higher than the color sub-carrier frequency fsc. The oscillation signal OSL1 is supplied to the frequency dividers 7*c*/7*d*. The frequency divider 7*c* reduces the frequency to a quarter, and produces the color carrier signal at the color sub-carrier frequency fsc for the color modulation. The color carrier signal is supplied from the frequency divider 7*c* to the video encoder 6*c*.

On the other hand, the frequency divider 7*d* reduces the frequency to 1/1127, and supplies the low frequency oscillating signal OSL2 to the phase comparator 7*g*. The phase comparator 7*g* compares the low frequency oscillating signal OSL2 with a low frequency clock signal CLK1, and produces an output signal S7 indicative of the phase difference. The output signal S7 is supplied to the low-pass filter 7*h*, and the low-pass filter 7*h* produces a control signal CTL1 from the output signal S7. The magnitude of the control signal CTL1 is proportional to the magnitude of the phase difference, and the low-pass filter 7*h* supplies the control signal CTL1 to the voltage controlled oscillator 7*e*. The voltage controlled oscillator 7*e* varies the frequency of the clock signal Vclk in such a manner as to minimize the phase difference, and oscillates around 13.5015 MHz. The clock signal Vclk is supplied to the MPEG decoder 6*b* and the frequency divider 7*f*. The frequency divider 7*f* reduces the frequency to 1/858, and supplies the low frequency clock signal CLK1 to the phase comparator 7*g*.

The MPEG decoder 6*b* reduces the frequency of the clock signal Vclk to 1/858 so as to produce the horizontal synchronous signal from the clock signal Vclk. Thus, the phase locked loop 7*a* and the combination of oscillator 7*b* and the frequency divider 7*c* regulate the color sub-carrier frequency fsc and the horizontal synchronous frequency $f_H$ as $$fsc=1127/4\ f_H \quad (1)$$

However, the horizontal synchronous frequency $f_H$ is slightly different from the horizontal synchronous frequency $f_{Ht}$ requested in the PAL standards, and color difference takes place in case where a frame consists of 521 lines. In detail, the PAL system requires 4.433619 MHz as the color sub-carrier frequency fsc, and the oscillator 7*b* oscillates at 17.734476 MHz, which is exactly four times higher than the color sub-carrier frequency fsc of the PAL standards. The horizontal synchronous signal is required to be synchronous with the color carrier signal, and, for this reason, the oscillation signal OSL1 is supplied to both of the frequency divider 7*c* and the phase locked loop 7*a*. The voltage controlled oscillator 7*e* oscillates at 13.5015 MHz, and the clock signal Vclk is reduced to 1/858. When we divide 13.5015 MHz by 858, the quotient is 15.736 KHz, and the horizontal period is 63.55 μs. Therefore, the digital video signal has the horizontal synchronous frequency of 15.736 KHz. On the other hand, the PAL standards request the video signal to have the horizontal synchronous frequency of 15.625 KHz, and the horizontal period is 64.00 μs. Thus, the prior art video reproducer supplies the video signal slightly offset from the PAL standards to the television receiver.

The television receiver reproduces a moving picture from the analog video signal, and the color is demodulated as follows. A delay circuit is incorporated in the television receiver, and a piece of analog video signal for a certain horizontal line is delayed so as to add it to or subtract it from another piece of analog video signal for the next horizontal line. Using the sum or the difference, the television receiver demodulates the analog video signal. The delay is corresponding to the horizontal period of 64.00 μs. However, the piece of analog video signal for the certain horizontal line requires 63.55 μs. As a result, the piece of analog video signal is deviated from another piece of analog video signal by 0.45 μs, and the deviation is equivalent to be twice as long as the cycle at the color sub-carrier frequency fsc. This means that the chrominance signal is deviated from the luminance signal, and color difference takes place along the boundary between the lines of pixels.

SUMMARY OF THE INVENTION

It is therefore an important object of the present invention to provide a signal processing circuit, which produces a video signal exactly, matched with the PAL standards from a playback signal formatted in compliance with the NTSC standards.

It is another important object of the present invention to provide a method of reproducing a color image from a video signal for a PAL system produced on the basis of a playback signal formatted in compliance with the NTSC standards.

In accordance with one aspect of the present invention, there is provided a video signal processor for supplying an analog video signal with 521 lines in each frame to a display, and the video signal processor comprises a decoder supplied with an input signal formatted in accordance with the standards of National Television System Committee and producing a digital video signal with a vertical synchronous frequency and a horizontal synchronous frequency satisfying a standard of Phase Alternation by Line Color Television System, an encoder connected to the decoder and producing the analog video signal with a color sub-carrier frequency satisfying another standard of the Phase Alternation by Line Color Television System and a signal generator connected to the decoder and the encoder, and supplying a first output signal used in generation of at least the horizontal synchronous frequency and a second output signal used in generation of the color sub-carrier frequency to the decoder and the encoder, the first output signal and the second output signal being regulated in such a manner as to satisfy $$fsc=\{(1135/4)+(1/521)\}f_H$$

where fsc is the color sub-carrier frequency and $f_H$ is the horizontal synchronous frequency.

In accordance with another aspect of the present invention, there is provided a method of controlling a video signal processor, and the method comprises the steps of receiving an input signal representative of pieces of video information formatted in the standards of National Television System Committee, decoding the input signal to a digital video signal with a vertical synchronous frequency and a horizontal synchronous frequency satisfying a standard of Phase Alternation by Line Color Television System and encoding the digital video signal into an analog video signal with a color sub-carrier frequency satisfying another standard of the Phase Alternation by Line Color Television System and the following equation $$fsc=\{(1135/4)+(1/521)\}f_H$$

where fsc is the color sub-carrier frequency and $f_H$ is the horizontal synchronous frequency.

BRIEF DESCRIPTION OF THE DRAWINGS

The features and advantages of the signal processing circuit and the method will be more clearly understood from the following description taken in conjunction with the accompanying drawings in which.

DESCRIPTION OF THE PREFERRED EMBODIMENTS

First Embodiment

Figure 4:
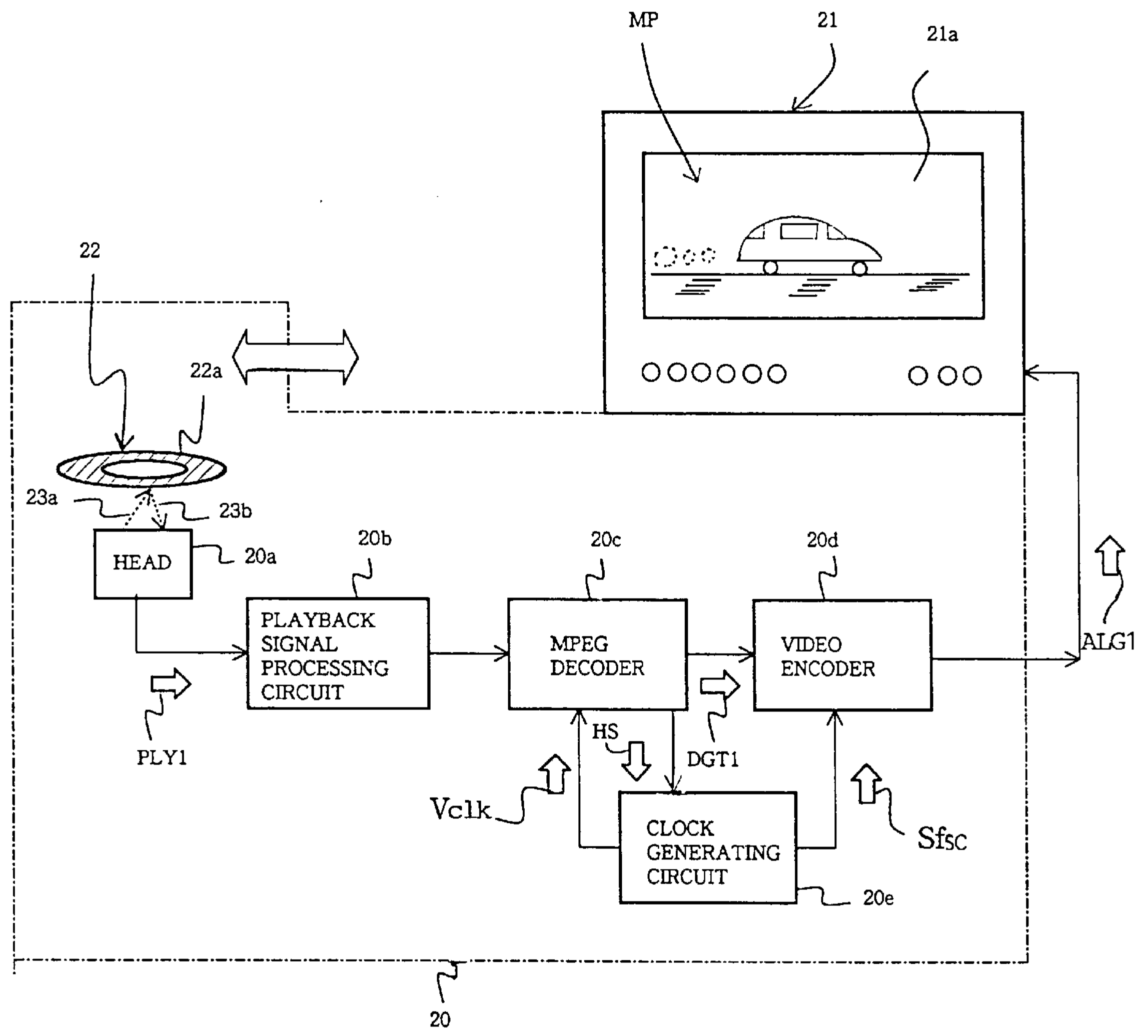
FIG. 4 is a block diagram showing a video reproducing apparatus according to the present invention.

Referring to FIG. 4 of the drawings, a video reproducing apparatus 20 embodying the present invention is connected to a television receiver 2 1. The television receiver 21 reproduces a moving picture MP on a screen 21*a* from an analog video signal ALG1 of the PAL standards except for the field frequency. The field frequency is adjusted to 60 Hz. On the other hand, the video reproducing apparatus 20 reads pieces of video information from a recording surface 22*a* of a video compact disk, and produces a playback signal PLY1 formatted in compliance with the NTSC standards. Thus, the video reproducing apparatus 20 produces the analog video signal of the PAL standards from the playback signal PLY1 of the NTSC standards.

Figure 1:
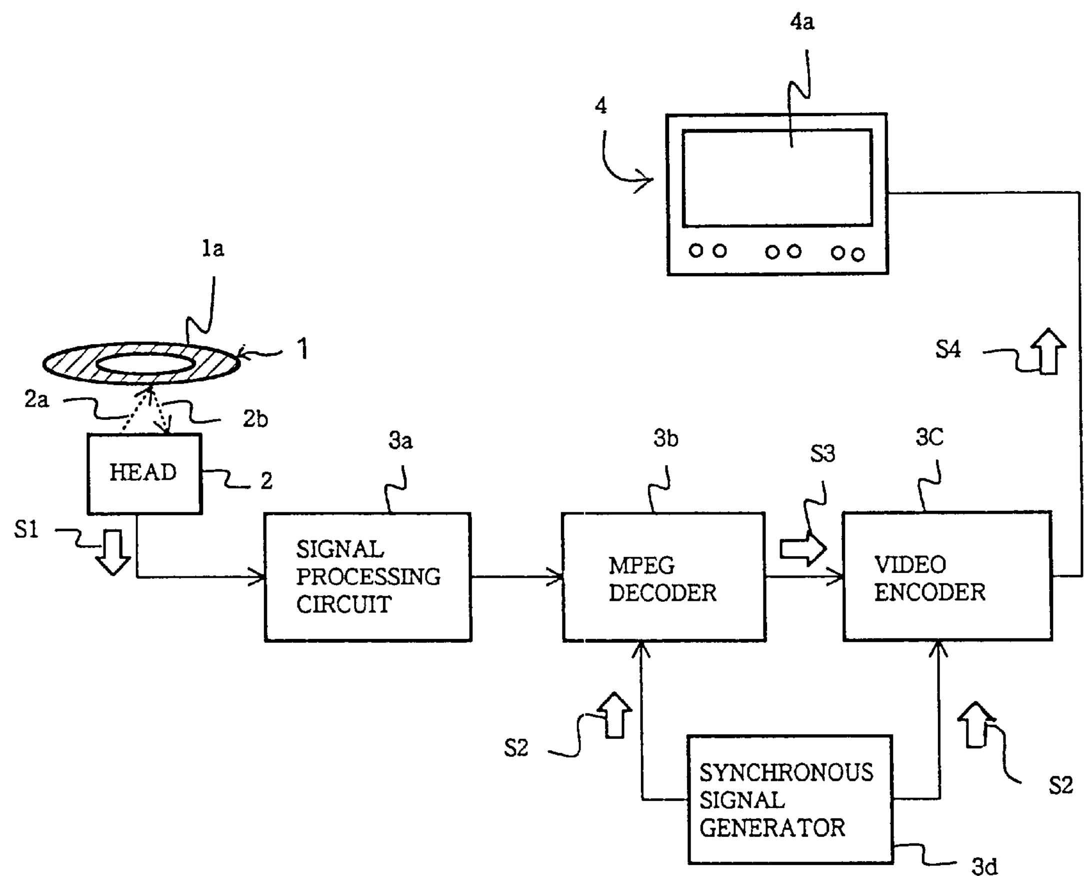
FIG. 1 is a block diagram showing the prior art video reproducing apparatus.
Figure 2:
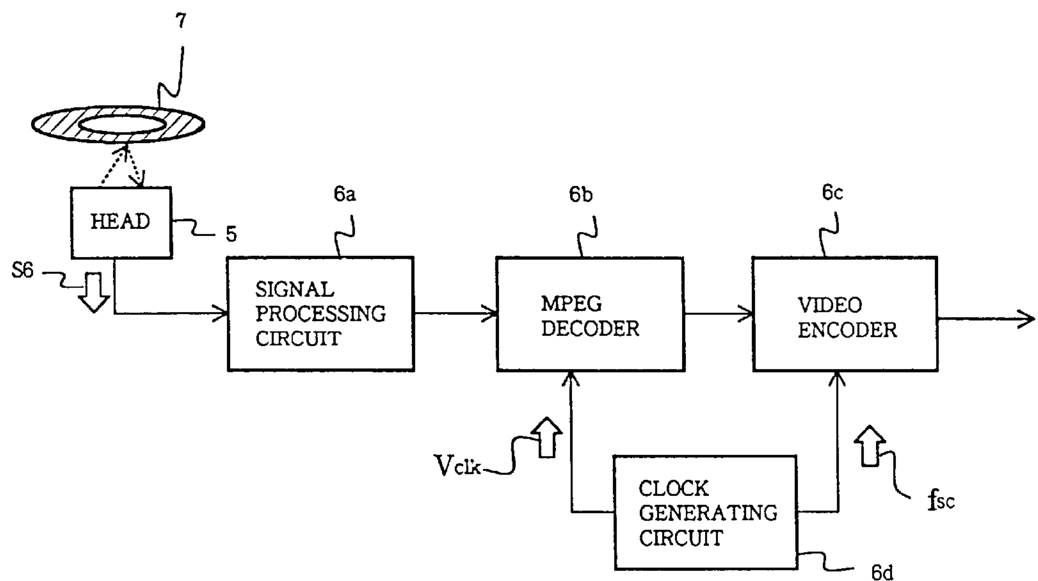
FIG. 2 is a block diagram showing the prior art video reproducing apparatus for producing the PAL signal from the NTSC signal.
Figure 3:
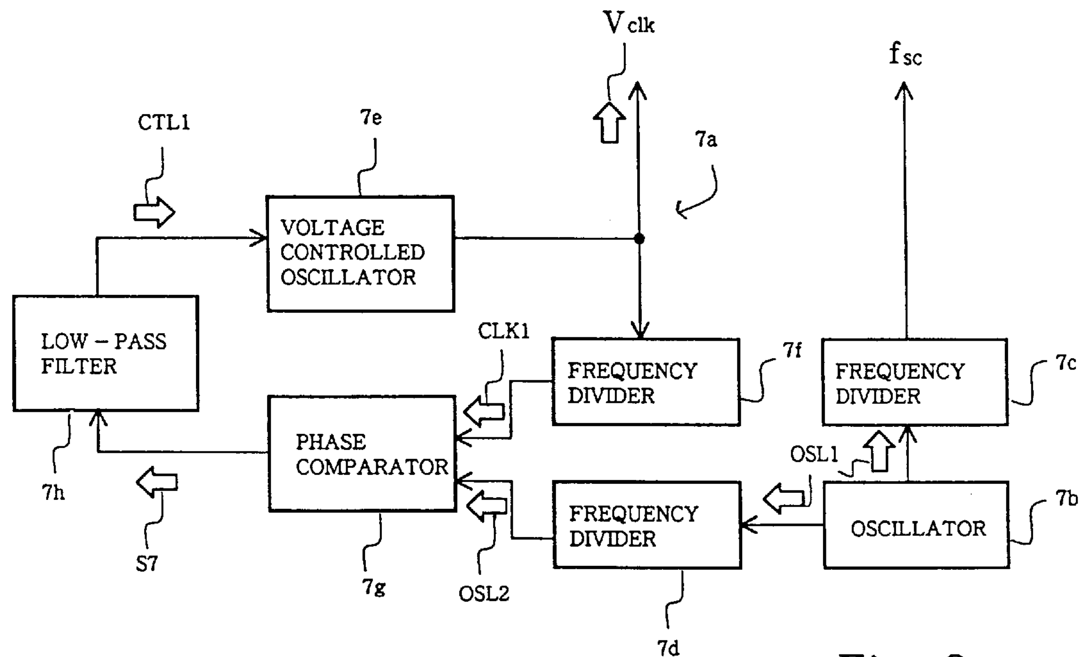
FIG. 3 is a block diagram showing the circuit configuration of the clock generating circuit incorporated in the prior art video reproducing apparatus.

The video reproducing apparatus 20 includes a head 20*a*, a playback signal processing circuit 20*b* connected to the head 20*a*, an MPEG decoder 20*c* connected to the playback signal processing circuit 20*b*, a video encoder 20*d* connected to the video encoder 20*d* and a clock generating circuit 20*e* connected to both of the MPEG decoder 20*c* and the video encoder 20*d*. The head 20*a*, the playback signal processing circuit 20*b*, the MPEG decoder 20*c* and the video encoder 20*d* are similar to those of the prior art video reproducing apparatus shown in FIG. 2, and only the clock generating circuit 20*e* is different therefrom.

The head 20*a* radiates a laser light beam 23*a* onto the recording surface 22*a*, and receives the reflection 23*b* carrying the pieces of video information. The head 20*a* produces the playback signal PLY1 representative of the pieces of video information, and the playback signal PLY1 is supplied from the head 20*a* through the playback signal producing circuit 20*b* to the MPEG decoder 20*c*, and the MPEG decoder 20*c* produces a digital video signal DGT1. The MPEG decoder 20*c* produces the digital video signal DGT1 under the conditions where each horizontal line consists of 864 pixels and each frame consists of 521 lines. For this reason, the horizontal synchronous signal Hs has a horizontal synchronous frequency $f_H$ reduced to 1/864 of a clock signal Vclk. In this instance, the horizontal synchronous signal Hs is supplied to the clock generating circuit 20*e*, and the clock generating circuit 20*e* regulates the clock signal Vclk to a frequency appropriate to produce the horizontal synchronous signal Hs matched with the PAL standards.

The digital video signal DGT1 is supplied to the video encoder 20*d*, and the video encoder 20*d* produces the analog video signal AlG1 from the digital video signal DGT1. The clock generating circuit 20*e* supplies a color carrier signal Sfsc and the clock signal Vclk to the MPEG decoder 20*c* and the video encoder 20*d*. The color carrier signal Sfsc has the color sub-carrier frequency fsc, and is used for a color modulation in compliance with the PAL standards.

Figure 5:
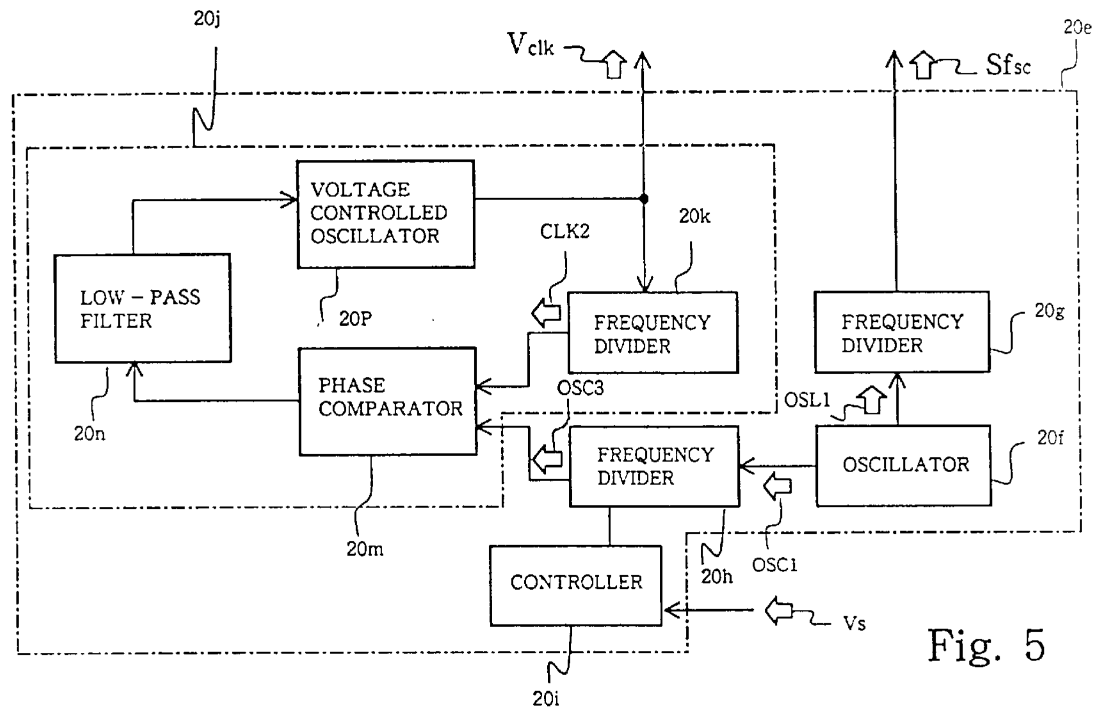
FIG. 5 is a block diagram showing a clock generating circuit incorporated in the video reproducing apparatus shown in FIG. 4.

FIG. 5 illustrates the circuit configuration of the clock generating circuit 20*e*. The clock generating circuit 20*e* includes an oscillator 20*f*, frequency dividers 20*g*/20*h*, a phase locked loop 20*j* and a controller 20*i*. A frequency divider 20*k*, a phase comparator 20*m*, a low-pass filter 20*n* and a voltage controlled oscillator 20*p* form the phase locked loop 20*j*.

The clock signal generating circuit 20*e* is different from the prior art clock signal generating circuit 6*d* in the behavior of the frequency dividers 20*k*/20*h*. The oscillator 20*f* generates an oscillation signal OSC1 at 17.734476 MHz, and the frequency divider 20*g* reduces the frequency to a quarter. Thus, the frequency divider 20*g* supplies the color carrier signal SFsc at 4.433619 MHz to the video encoder 20*d* as similar to those of the prior art. The frequency of the color carrier signal SFsc is a quarter of the oscillating frequency of the oscillation signal OSC1, and is matched with the PAL standards.

The voltage controlled oscillator 20*p* generates the clock signal Vclk at 13.5 MHz, and the frequency divider 20*k* reduces the frequency of the oscillation signal OSC1 to 1/864. Thus, the frequency ratio between the clock signal Vclk and a low frequency clock signal CLK2 is different from that of the prior art clock generating circuit 7*a*.

The frequency divider 20*h* reduces the frequency of the oscillation signal OSC1 in a different manner from the frequency divider 7*f*, and the frequency ratio between the oscillation signal OSC1 and a low-frequency oscillation signal OSC3 is varied in each frame by the controller 20*i*. In this instance, the frequency divider 20*h* reduces the frequency to 1/1139 one in each frame and to 1/1135 in the remaining part of the frame. The frequency divider 20*h* may reduce the frequency to 1/1137 twice in each frame and 1/1135 in the remaining part of the frame. Alternatively, the frequency divider 20*h* may reduce the frequency to 1/1136 four times in each frame and 1/1135 in the remaining part of the frame. As a result, the color sub-carrier frequency fsc and the horizontal synchronous frequency $f_H$ are defined in the following equation $$fsc=\{(1135/4)+(1/521)\}f_H \quad (2)$$

The color sub-carrier frequency fsc is exactly adjusted to the 4.433619 MHz in compliance with the PAL standards, and the voltage controlled oscillator 20*p* generates the clock signal Vclk at 13.5 MHz. As a result, the horizontal synchronous frequency $f_H$ is 15.625 KHz. Thus, both of the color sub-carrier frequency fsc and the horizontal synchronous frequency $f_H$ are exactly matched with the PAL standards. The frequency change in the divider 20*h* makes a frame offset take place in each frame when the frame consists of 521 lines. The term "frame offset" means a phase change of the color sub-carrier signal equivalent to a single period fsc. If there is not any frame offset, the dot crawling interference takes place. However, the video reproducing apparatus according to the present invention prevents the television receiver 21 from the dot crawling interference by virtue of the frame offset.

As will be understood from the foregoing description, the frequency divider 20*h* changes the frequency ratio between the oscillation signal OSC1 and the low frequency oscillation signal OSC3 in each frame, and causes the MPEG decoder 20*c* and the video encoder 20*d* to exactly adjust the horizontal synchronous frequency $f_H$ and the color sub-carrier frequency fsc to those requested in the PAL standards. For this reason, the moving picture MP on the screen 21*a* is prevented from undesirable color difference.

Second Embodiment

Figure 6:
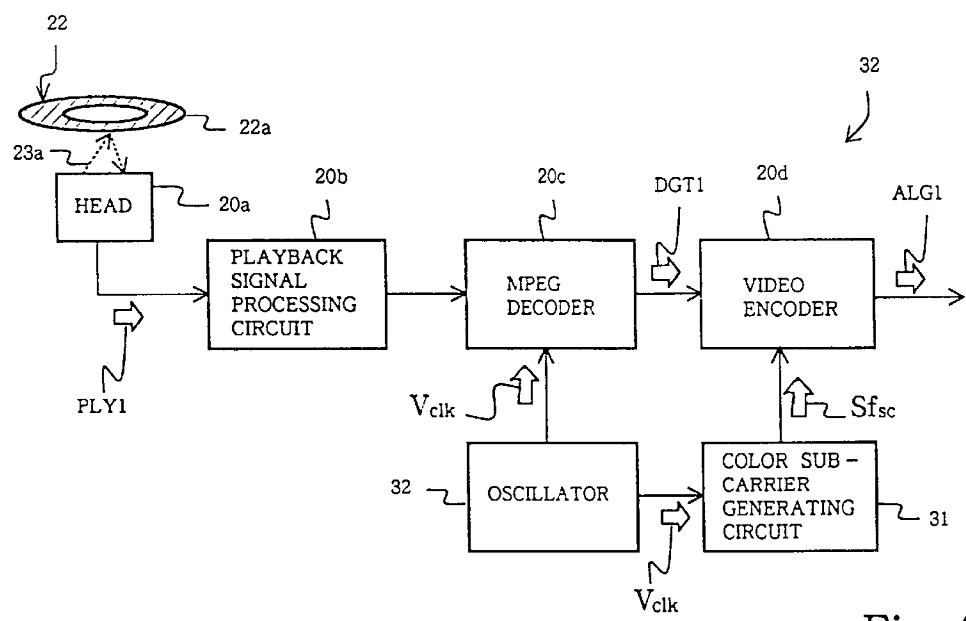
FIG. 6 is a block diagram showing another video reproducing apparatus according to the present invention.

Turning to FIG. 6 of the drawings, a color sub-carrier generating circuit 31 and an oscillator 32 are incorporated in another video reproducing apparatus 32 embodying the present invention. In the video reproducing apparatus 32, the color sub-carrier generating circuit 31 and the oscillator 32 are corresponding to the clock generating circuit 20*e* of the first embodiment. The other components are similar to those of the first embodiment, and, for this reason, the other components are labeled with the same references without detailed description.

The oscillator 32 produces the clock signal Vclk exactly 864 times higher in frequency than the horizontal synchronous signal Hs, and the clock signal Vclk is at 13.5 MHz. The clock signal Vclk is supplied to the MPEG decoder 20*c* and the color sub-carrier generating circuit 31, and the color sub-carrier generating circuit 31 produces the color carrier signal Sfsc from the clock signal Vclk. The color sub-carrier generating circuit 31 controls the color sub-carrier frequency fsc in such a manner as to satisfy equation (2), i.e., $fsc=\{(1135/4)+(1/521)\}f_H$, and may use the direct digital synthesizer technology.

The head 20*a* radiates the laser light beam 23*a* onto the recording surface 22*a*, and receives the reflection 23*b* carrying the pieces of video information. The head 20*a* produces the playback signal PLY1 representative of the pieces of video information, and the playback signal PLY1 is supplied from the head 20*a* through the playback signal producing circuit 20*b* to the MPEG decoder 20*c*. The MPEG decoder 20*c* produces the horizontal synchronous signal Hs and the vertical synchronous signal on the basis of the clock signal Vclk, and carries out the data expansion. The MPEG decoder 20*c* produces the digital video signal DGT1, and supplies it to the video encoder 20*d*. The MPEG decoder 20*c* produces the digital video signal DGT1 under the conditions where each horizontal line consists of 864 pixels and each frame consists of 521 lines.

The video encoder 20*d* produces the analog video signal ALG1 from the digital video signal DGT1. The clock sub-carrier generating circuit 31 supplies the color carrier signal Sfsc to the video encoder 20*d*, and the color carrier signal Sfsc is used for a color modulation in compliance with the PAL standards. In this instance, the color carrier signal Sfsc is produced through a digital data processing, and the video encoder 20*d* is implemented by digital circuits. As a result, the MPEG decoder 20*c*, the video encoder and the color sub-carrier generating circuit 31 are integrated on a single semiconductor chip.

Although particular embodiments of the present invention have been shown and described, it will be obvious to those skilled in the art that various changes and modifications may be made without departing from the spirit and scope of the present invention.

For example, the pixels on each line may be different from 864. In this instance, the MPEG decoder changes the built-in frequency divider so as to regulate the horizontal synchronous frequency to the PAL standards.

What is claimed is:

1. A video signal processor for supplying an analog PAL signal, comprising:

a decoder supplied with an NTSC signal and producing a digital video signal with a vertical synchronous frequency and a horizontal synchronous frequency satisfying a PAL standard, an encoder connected to said decoder and producing said analog video signal with a color sub-carrier frequency satisfying a PAL standard, and a signal generator connected to said decoder and said encoder and supplying a first output signal, used in generation of at least a horizontal synchronous frequency ($f_H$), and a second output signal, used in the generation of a color sub-carrier frequency (fsc), to said decoder and said encoder respectively, said first output signal and said second output signal being regulated such that the relationship between $f_H$ and fsc is $$fsc=\{(1135/4)+(1/521)\}\times f_H$$

2. The video signal processor as set forth in claim 1, in which each of said 521 lines contains pieces of video information for plural pixels on said each line.

3. The video signal processor as set forth in claim 2, in which said decoder carries out a frequency dividing operation for reducing the frequency of said first signal to 1/PX where PX is the number of said pixels.

4. The video signal processor as set forth in claim 3, in which the number of said pixels is 864.

5. The video signal processor as set forth in claim 1, in which said signal generator includes an oscillator for producing an oscillation signal with a frequency multipie of said color sub-carrier frequency, a first frequency divider connected to said oscillator for producing said second output signal with said color sub-carrier frequency from said oscillation signal, a second frequency divider connected to said oscillator and carrying out a first frequency dividing operation at a first frequency dividing ratio and a second frequency dividing operation at a second frequency dividing ratio different from said first frequency dividing ratio during said each frame for producing a low frequency oscillation signal, and a phase locked loop comparing a low frequency signal produced from said first output signal with said low frequency oscillation signal so as to synchronize said first output signal with said second output signal.

6. The video signal processor as set forth in claim 5, in which said first frequency dividing ratio is 1/1139, said first frequency dividing operation is carried out once, said second frequency dividing ratio is 1/1135, and said second frequency dividing operation is multiply repeated.

7. The video signal processor as set forth in claim 5, in which said first frequency dividing ratio is 1/1137, said first frequency dividing operation is repeated twice, said second frequency dividing ratio is 1/1135, and said second frequency dividing operation is multiply repeated.

8. The video signal processor as set forth in claim 5, in which said first frequency dividing ratio is 1/1136, said first frequency dividing operation is repeated four times, said second frequency dividing ratio is 1/1135, and said second frequency dividing operation is multiply repeated.

9. The video signal processor as set forth in claim 1, in which said signal generator includes an oscillator for producing said first output signal at a frequency multiple of said horizontal synchronous frequency, and a color sub-carrier generating circuit connected to said oscillator for producing said second output signal at said color sub-carrier frequency.

10. The video signal processor as set forth in claim 9, in which said color sub-carrier generating circuit produces said second output signal through a direct digital synthesizer technology.

11. The video signal processor as set forth in claim 10, in which said encoder is responsive to said second output signal for producing said analog video signal through a digital signal processing.

12. A method of controlling a video signal processor, comprising the steps of:

a) receiving an input signal representative of pieces of video information formatted in the standards of National Television System committee;

b) decoding said input signal to a digital video signal with a vertical synchronous frequency and a horizontal synchronous frequency satisfying a standard of Phase Alternation by Line Color Television System; and c) encoding said digital video signal into an analog video signal with a color sub-carrier frequency satisfying another standard of said Phase Alternation by Line Color Television System and the following equation $$fsc=\{(1135/4)+(1/521)\}f_H$$

where fsc is said color sub-carrier frequency and $f_H$ is said horizontal synchronous frequency.

13. The method as set forth in claim 11, in which said input signal is supplied from a head for reading said pieces of video information from a video compact disk.

14. A video signal processor for outputting an analog PAL signal, comprising:

an MPEG decoder supplied with an NTSC signal and outputting a decoded digital signal;

a video encoder connected to said MPEG decoder and converting said digital signal to an analog PAL signal; and a signal generator connected to said decoder and said video encoder and supplying a signal synchronous with a horizontal synchronous signal ($f_H$) to said decoder and supplying a signal synchronous with a color sub-carrier signal (fsc) to said video encoder, such that the relationship between $f_H$ and fsc is defined by $$fsc=\{(1135/4)+(1/521)\}\times f_H.$$

* * * * *